(12) United States Patent
Wang (10) Patent No.: US 7,478,585 B2
(45) Date of Patent: Jan. 20, 2009

(54) COOKING DEVICE

(75) Inventor: Hsin Tsung Wang, Tainan (TW)

(73) Assignee: Tsann Kuen Enterprise Co., Ltd,, Taipei (TW)

( * ) Notice: Subject to any disclaimer, the term of this patent is extended or adjusted under 35 U.S.C. 154(b) by 0 days.

(21) Appl. No.: 11/545,396

(22) Filed: Oct. 10, 2006

(65) Prior Publication Data

US 2007/0089728 A1    Apr. 26, 2007

(30) Foreign Application Priority Data

Oct. 14, 2005    (CN) .................... 2005 1 0044963

(51) Int. Cl.
*A47J 37/00* (2006.01)
(52) U.S. Cl. .............. 99/337; 99/349; 99/372; 99/379; 99/444
(58) Field of Classification Search ........... 99/327–333, 99/372–384, 339, 389–393, 444–450, 349, 99/350; 219/521–525
See application file for complete search history.

(56) References Cited

U.S. PATENT DOCUMENTS 4,838,153 A    6/1989 Escamilla et al.
6,012,380 A *  1/2000 Hermansson ................ 99/337
6,167,796 B1 * 1/2001 Wright et al. ................ 99/332
6,782,804 B1 * 8/2004 Lin ............................. 99/349

FOREIGN PATENT DOCUMENTS

| GB | 1164427 A | 9/1969 |
| GB | 2 412 298 A | 9/2005 |
| WO | 02/09564 A1 | 2/2002 |
| WO | 2005/002407 A1 | 1/2005 |

* cited by examiner

*Primary Examiner*—Timothy F. Simone
(74) *Attorney, Agent, or Firm*—Ladas & Parry LLP (57) ABSTRACT

A cooking device includes: a base unit; a cooking unit including a griddle member having opposite first and second portions and a pivot portion that is disposed between the first and second portions and that is pivoted to the base unit; and an adjusting unit including a rotatable spindle mounted rotatably on the base unit and having a bent end that is connected to the second portion of the griddle member in such a manner that rotation of the spindle relative to the base unit results in pivoting movement of the griddle member relative to the base unit so as to selectively lift and lower the second portion of the griddle member relative to the base unit.

8 Claims, 9 Drawing Sheets

COOKING DEVICE

BACKGROUND OF THE INVENTION

1. Field of the Invention

This invention relates to a cooking device, more particularly to a cooking device having a pivotable cooking unit.

2. Description of the Related Art

A cooking device generally includes a griddle member having an upper plate and a lower plate, and a base unit. In use, the griddle member is usually at a horizontal state, which is suitable for cooking eggs or waffles that are in a liquid state before cooking so as to achieve even thickness. However, when cooking vegetables or meat, the oil or broth produced during cooking is accumulated in the lower plate when the griddle member is at the horizontal state such that vegetable or meat is immersed in the oil or broth, thereby resulting in a loss of food flavor.

In order to overcome the aforesaid drawback, another type of cooking device is has been proposed heretofore. The cooking device includes a griddle member having front and rear sides, and a base unit. The front side of the griddle member of this cooking device is downwardly inclined relative to the rear side such that the oil or broth produced during cooking flows forwardly and downwardly and can be collected. However, this kind of cooking device cannot be used for cooking eggs or waffles.

Therefore, there is a need in the art to provide a cooking device that can be used to cook different kinds of food.

SUMMARY OF THE INVENTION

Therefore, the object of the present invention is to provide a cooking device that can fulfill the aforesaid requirement.

According to this invention, a cooking device includes: a base unit; a cooking unit including a griddle member having opposite first and second portions and a pivot portion that is disposed between the first and second portions and that is pivoted to the base unit; and an adjusting unit including a rotatable spindle mounted rotatably on the base unit and having a bent end that is connected to the second portion of the griddle member in such a manner that rotation of the spindle relative to the base unit results in pivoting movement of the griddle member relative to the base unit so as to selectively lift and lower the second portion of the griddle member relative to the base unit.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
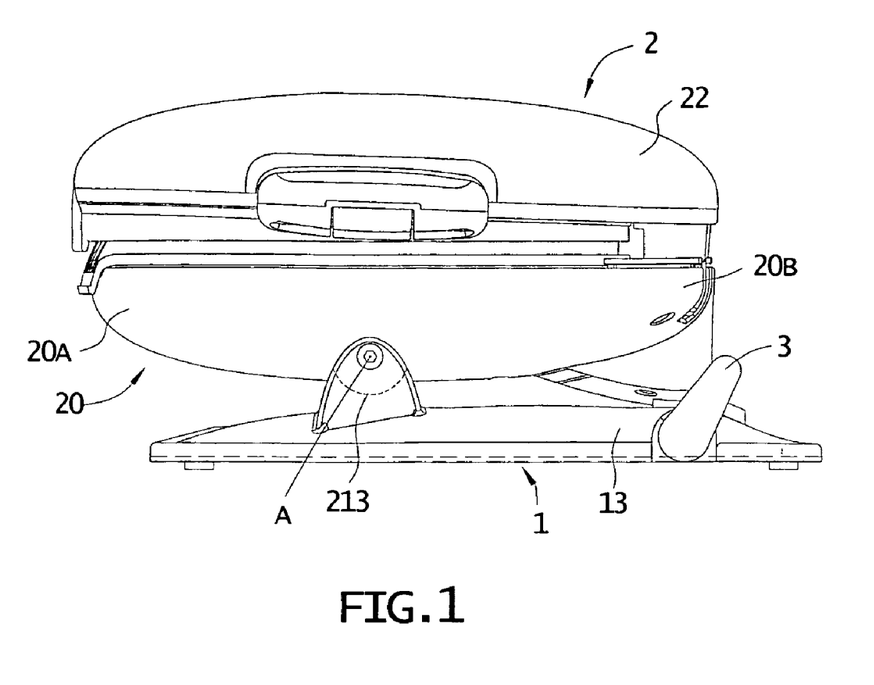
FIG. 1 is an assembled schematic side view of the preferred embodiment of a cooking device according to this invention at a horizontal state.
Figure 2:
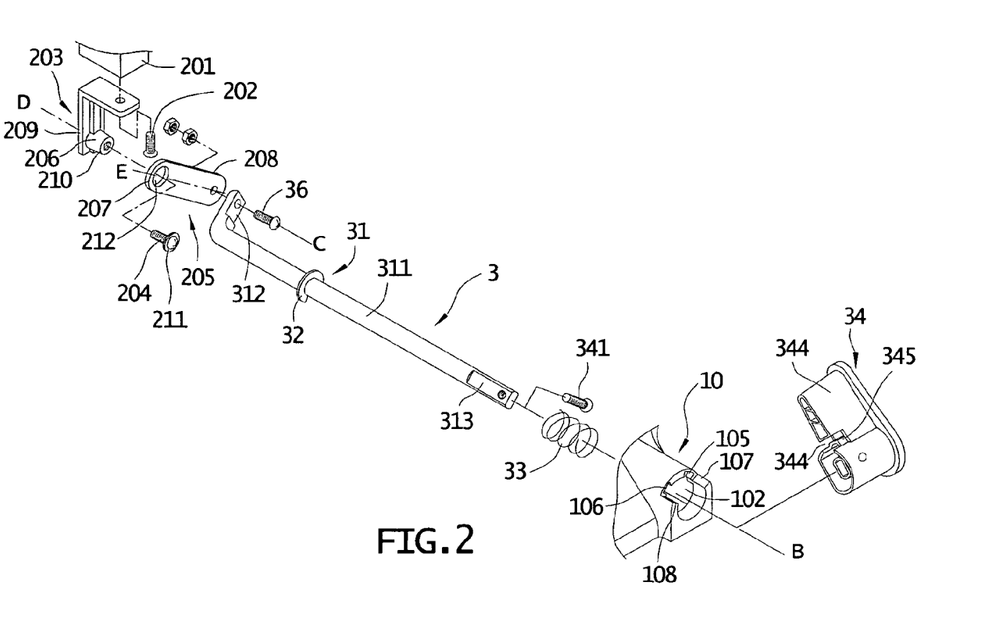
FIG. 2 is a fragmentary exploded perspective view illustrating the connecting relationship among an adjusting unit, a cooking unit, and a base unit of the preferred embodiment.
Figure 3:
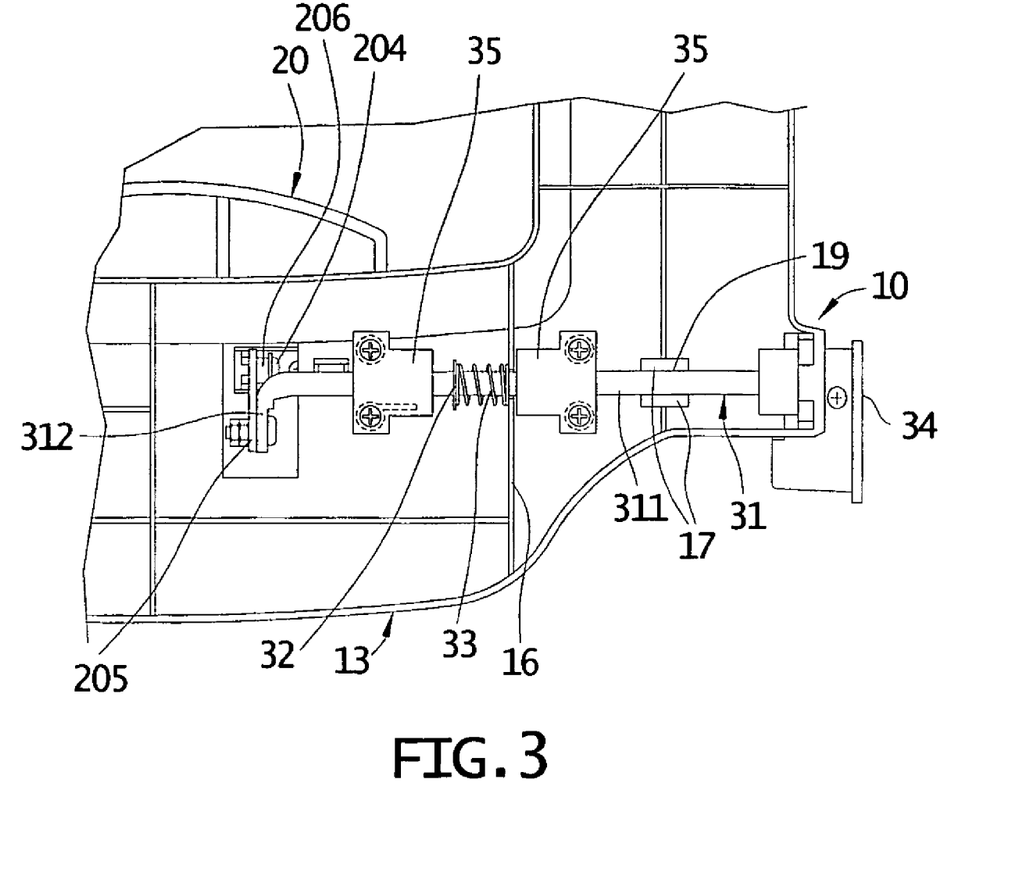
FIG. 3 is a fragmentary schematic bottom view illustrating the position relationship between the adjusting unit and the base unit of the preferred embodiment.

Referring to FIGS. 1 to 3, the preferred embodiment of a cooking device according to the present invention is shown to include a base unit 1, a cooking unit 2, and an adjusting unit 3. The cooking unit 2 includes a griddle member 20 having opposite first and second portions 20A, 20B and a pivot portion 213. The pivot portion 213 is disposed between the first and second portions 20A, 20B and is pivoted to the base unit 1. The adjusting unit 3 includes a rotatable spindle 31 mounted rotatably on the base unit 1 and having a bent end 312. The bent end 312 is connected to the second portion 20B of the griddle member 20 in such a manner that rotation of the spindle 31 relative to the base unit 1 about a second axis (B) results in pivoting movement of the griddle member 20 relative to the base unit 1 about a first axis (A) so as to selectively lift and lower the second portion 20B of the griddle member 20 relative to the base unit 1.

Preferably, the cooking unit 2 further includes a cover 22 for covering the griddle member 20. The griddle member 20 of the cooking unit 2 further has a mounting seat 201 connected to the second portion 20B of the griddle member 20, and a bracket 203 secured to the mounting seat 201 through a screw 202 (see FIG. 2). The bracket 203 has a limiting plate 209 and a linkage-mounting protrusion 206 protruding from the limiting plate 209. The linkage-mounting protrusion 206 extends transversely from the limiting plate 209, and has a free end 210 that is provided with a stopper 211.

The adjusting unit 3 further includes a linkage plate 205 having a first end 208 pivoted to the bent end 312 of the rotatable spindle 31 about a third axis (C) through a screw 36, and a second end 207 pivoted to the bracket 203 of the griddle member 20 about a fourth axis (D). The third axis (C) and the fourth axis (D) are parallel to the first axis (A) and the second axis (B). Specifically, the second end 207 of the linkage plate 205 is formed with a hole 212 for extension of the linkage-mounting protrusion 206 therethrough for pivot connection to the bracket 203. In this preferred embodiment, the bracket 203 further has a screw 204 which engages the free end 210 of the linkage-mounting protrusion 206, and which has a head that serves as the stopper 211. Preferably, the stopper 211 has a dimension greater than that of the hole 212 such that the second end 207 of the linkage plate 205 is disposed slidably between the limiting plate 209 and the stopper 211 so as to prevent removal of the linkage plate 205 from the linkage-mounting protrusion 206.

It should be noted herein that the bent end 312 of the spindle 31 can be extended and be directly connected to the linkage-mounting protrusion 206, thereby omitting the linkage plate 205.

As shown in FIGS. 1 and 2, the base unit 1 includes a base housing 13 having a spindle-journalling portion 10. The spindle-journalling portion 10 is formed with an axially extending through-hole 102, and radially extending first and second grooves 105, 106. The first and second grooves 105, 106 are angularly displaced and are in spatial communication with the through-hole 102. The spindle-journalling portion 10 is further formed with first and second stopping surfaces 107, 108 adjacent to the first and second grooves 105, 106, respectively.

Referring to FIG. 3, the base unit 1 has at least a pair of guiding members 17 that are spaced apart from each other by a gap 19, and that are used to guide axial movement of the spindle 31 in a manner to be described hereinafter. In this embodiment, the base unit 1 further has two supporting blocks 35 to support the spindle 31. The base unit 1 further includes a spring-abutting wall 16 disposed between the two supporting blocks 35.

As shown in FIG. 2, the spindle 31 has an operating end 313 that is opposite to the bent end 312 (which is disposed in the base housing 13 upon assembling), and a middle portion 311 extending between the operating end 313 and the bent end 312. The operating end 313 is journalled to the spindle-journalling portion 10 by extending into the through-hole 102. The middle portion 311 extends through the gap 19 so as to be guided by the guiding members 17 when moving axially. The middle portion 311 is provided with a ring 32 extending outwardly and axially therefrom.

Preferably, the adjusting unit 3 further includes an urging member 33 for urging the spindle 31 together with the operating lever 34 and the linkage plate 205 toward the limiting plate 209. The urging member 33 is sleeved on the middle portion 311 of the spindle 31, and abuts against the ring 32 of the middle portion 311 and the spring-abutting wall 16 of the base unit 1 (see FIG. 3).

Referring back to FIGS. 2 and 3, the adjusting unit 3 further includes an operating lever 34 provided with a retaining protrusion 345 and having first and second contacting surfaces 343, 344. The operating lever 34 is disposed outwardly of the base housing 13, and is connected securely to the operating end 313 of the spindle 31 through a screw 341. The operating lever 34 together with the spindle 31 and the linkage plate 205 is operable to move axially relative to the base unit 1 between a first axial position, where the retaining protrusion 345 engages one of the first and second grooves 105, 106 in the spindle-journalling portion 10, and a second axial position, where the retaining protrusion 345 disengages from said one of the first and second grooves 105, 106 in the spindle-journalling portion 10. In addition, the operating lever 34 is operable to co-rotate with the spindle 31 between a first angular position, in which the second portion 20B of the griddle member 20 is disposed at a level substantially the same as that of the first portion 20A of the griddle member 20 (i.e., a horizontal state, see FIG. 1), and a second angular position, in which the second portion 20B of the griddle member 20 is disposed at a level higher than that of the first portion 20A of the griddle member 20 (i.e., an inclined state, see FIG. 7).

Figure 4:
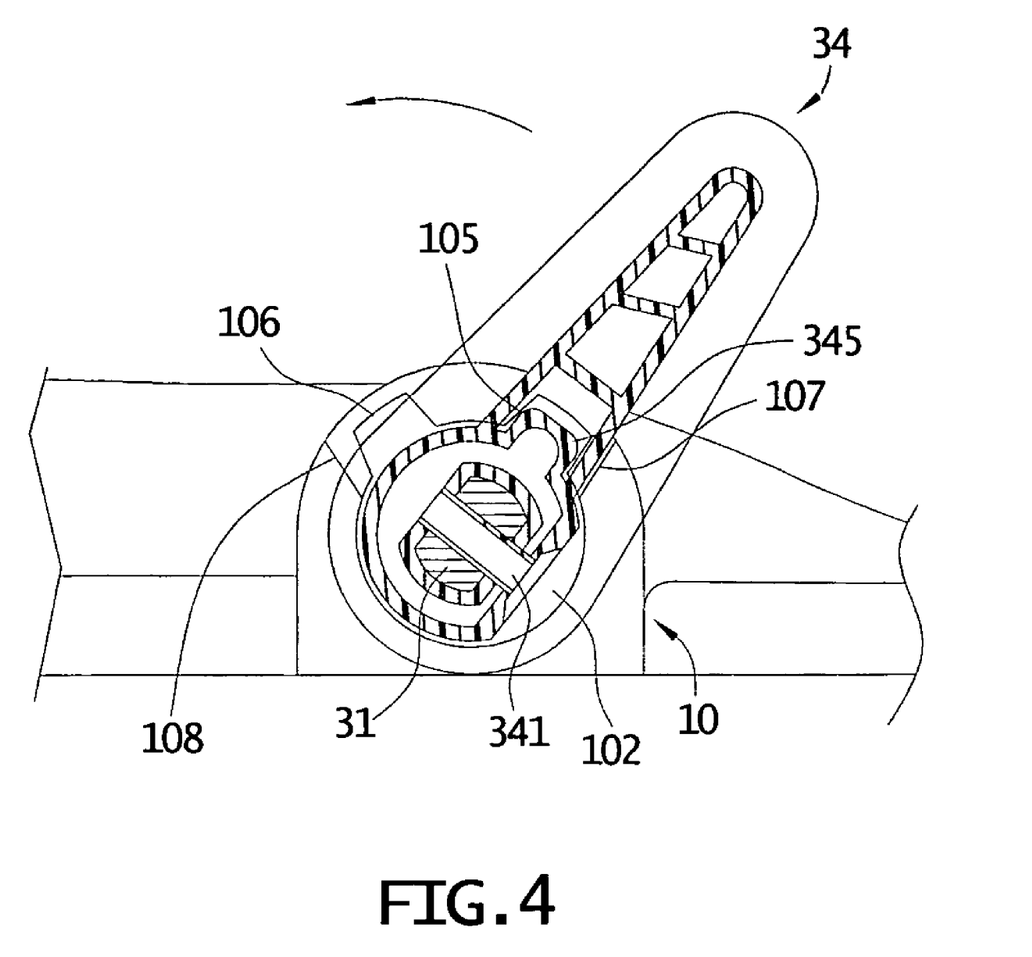
FIG. 4 is a fragmentary partly sectional schematic side view illustrating how an operating lever of the adjusting unit is rotated between first and second angular positions.
Figure 5:
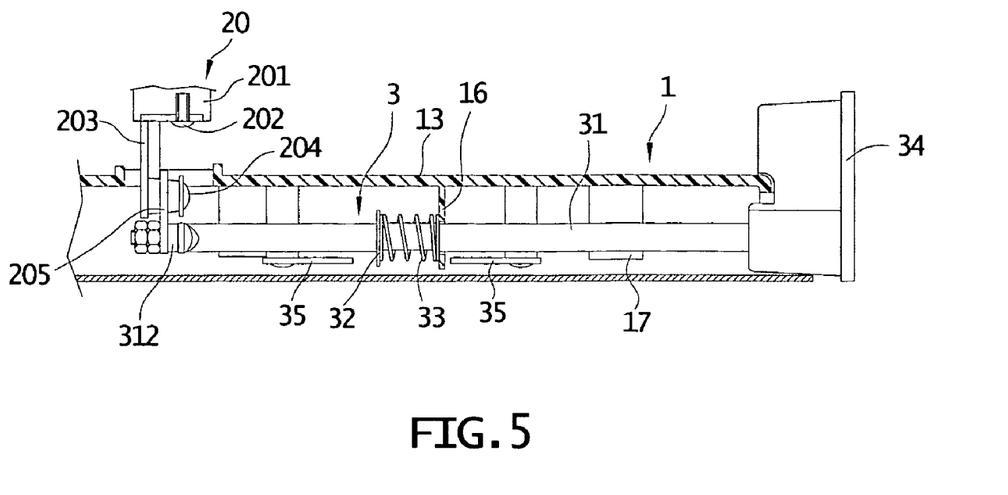
FIG. 5 is a fragmentary partly sectional view illustrating the adjusting unit of the preferred embodiment of the cooking device according to this invention at the horizontal state.

Specifically, when cooking eggs or waffles, the cooking unit 2 is preferably disposed at the horizontal state shown in FIG. 1. As shown in FIGS. 2, 4, and 5, at the horizontal state, the retaining protrusion 345 engages the first groove 105 in the spindle-journalling portion 10, and the linkage plate 205 is inclined relative to the middle portion 311 of the spindle 31. That is, an axis (E) extending from the first end 208 of the linkage plate 205 to the second end 207 of the linkage plate 205 is inclined relative to the second axis (B).

Figure 6:
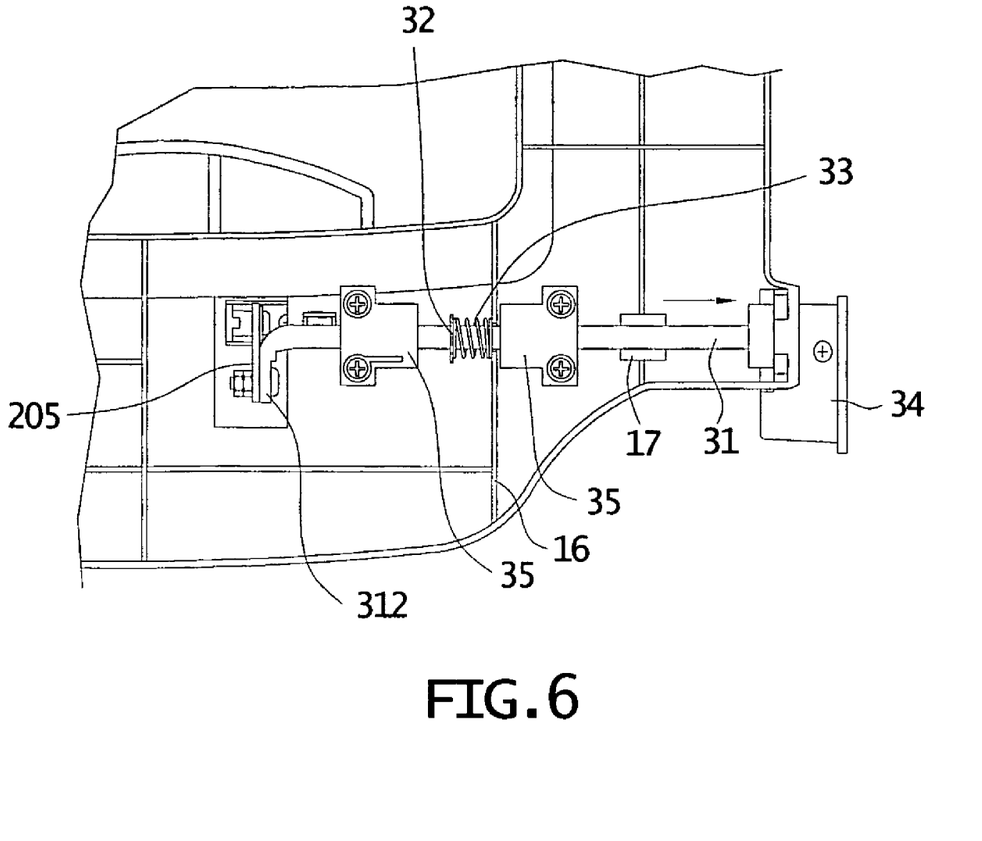
FIG. 6 is a fragmentary schematic bottom view illustrating the situation where a spindle of the adjusting unit is pulled from a first axial position to a second axial position.
Figure 7:
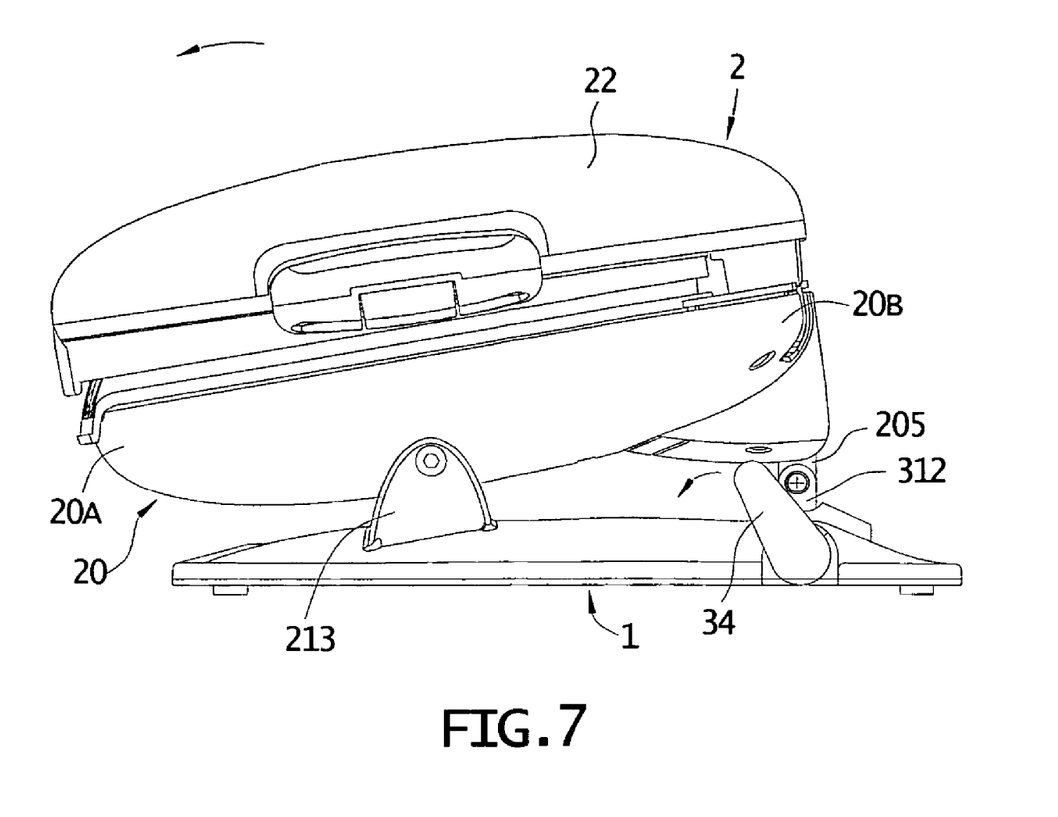
FIG. 7 is an assembled schematic side view illustrating the preferred embodiment of the cooking device according to this invention at an inclined state.
Figure 8:
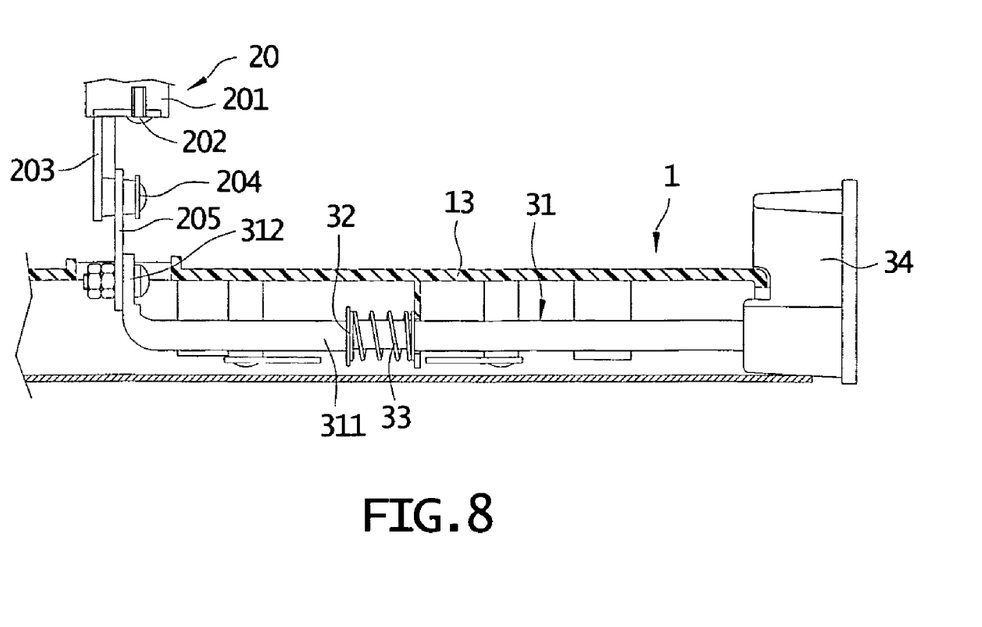
FIG. 8 is a fragmentary partly sectional view illustrating the adjusting unit of the preferred embodiment of the cooking device according to this invention at the inclined state.
Figure 9:
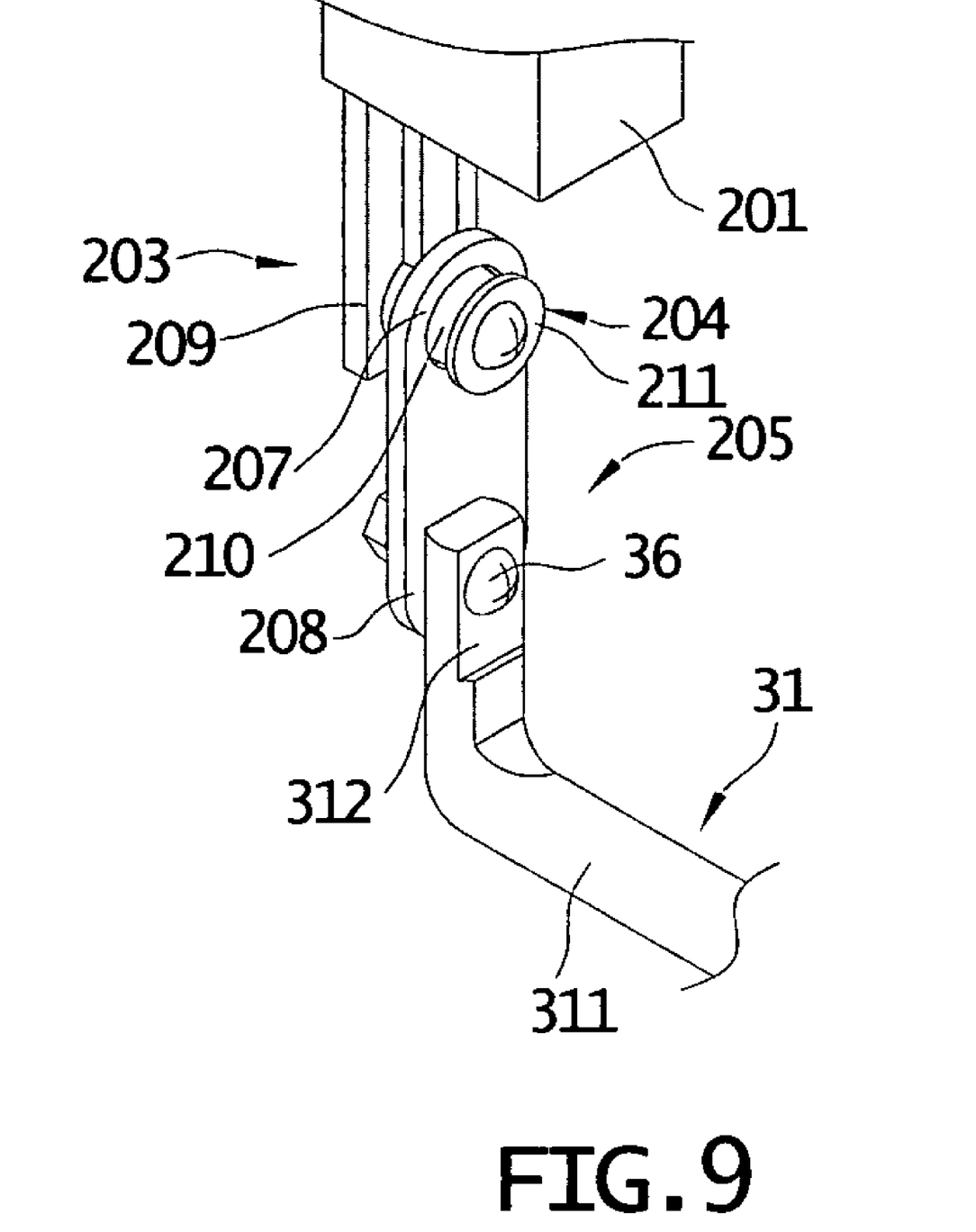
FIG. 9 is a fragmentary perspective view illustrating the relationship between a bent end of the spindle and a linkage plate when the griddle member is at the inclined state.

When the position of the cooking unit 2 is to be changed from the horizontal state to the inclined state shown in FIG. 7, the operating lever 34 is pulled against the urging force of the urging member 33 (see FIG. 6) so as to move the operating lever 34 together with the spindle 31 and the linkage plate 205 from the first axial position to the second axial position, thereby removing the retaining protrusion 345 from the first groove 105. In this situation, the operating lever 34 together with the spindle 31 is disposed at the first angular position and the second axial position. Subsequently, as shown in FIG. 4, the operating lever 34 is turned until the second contacting surface 344 (see FIG. 2) of the operating lever 34 contacts the second stopping surface 108 of the spindle-journalling portion 10 such that the operating lever 34 and the spindle 31 are angularly rotated from the first angular position to the second angular position about the second axis (B), such that the first end 208 of the linkage plate 205 is rotated relative to the bent end 312 of the spindle 31 about the third axis (C), and such that the second end 207 of the linkage plate 205 is rotated relative to the linkage-mounting protrusion 206 of the bracket 203 about the fourth axis (D). When the pulling force applied to the operating lever 34 is released, the operating lever 34 and the spindle 31 are moved to the first axial position by the urging force of the urging member 33 such that the retaining protrusion 345 engages with the second groove 106. In this situation, the axis (E) of the linkage plate 205 is perpendicular to the second axis (B), such that the position of the second portion 20B of the griddle member 20 is higher than that of the first portion 20A of the griddle member 20, thereby tilting the cooking unit 2 (see FIGS. 8 and 9). Furthermore, the cooking unit 2 can be restored to the horizontal state by moving the operating lever 34 and the spindle 31 to the first angular position and the first axial position. During movement from the second angular position and the second axial position to the first angular position and the second axial position, the operating lever 34 is turned until the first contacting surface 343 (see FIG. 2) of the operating lever 34 contacts the first stopping surface 107 (see FIG. 4) of the spindle-journalling portion 10.

According to the present invention, with the inclusion of the adjusting unit 3 in the cooking device, the griddle member 20 is movable between the horizontal state and the inclined state based on the type of the food to be cooked, thereby keeping the food flavor.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A cooking device comprising:
  a base unit;
  a griddle member having opposite first and second portions and a pivot portion that is disposed between said first and second portions;
  a cover; and
  an adjusting unit including a rotatable spindle mounted rotatably on said base unit and having a bent end that is connected to said second portion of said griddle member;
  wherein said pivot portion provides for pivotable rotation of the griddle member relative to said base unit between first and second positions;

wherein rotation of said spindle relative to said base unit results in pivoting movement of said griddle member relative to said base unit between said first and second positions;

wherein said cover is removably positionable adjacent said griddle member in a closed position; and wherein in said closed position said cover and said griddle member rotate together in the same direction between said first and second positions, relative to the base unit.

2. The cooking device of claim 1, wherein said griddle member further has a bracket secured to said second portion of said griddle member, said adjusting unit further including a linkage plate having a first end pivoted to said bent end of said rotatable spindle, and a second end pivoted to said bracket of said griddle member.

3. The cooking device of claim 2, wherein said bracket has a linkage-mounting protrusion protruding therefrom, said second end of said linkage plate being formed with a hole for extension of said linkage-mounting protrusion therethrough for pivot connection to said bracket.

4. The cooking device of claim 3, wherein said bracket further has a limiting plate, said linkage-mounting protrusion extending transversely from said limiting plate, and having a free end that is provided with a stopper, said second end of said linkage plate being disposed slidably between said limiting plate and said stopper.

5. The cooking device of claim 4, wherein said base unit includes a base housing having a spindle-journalling portion that is formed with an axially extending through-hole, and radially extending first and second grooves that are angularly displaced and that are in spatial communication with said through-hole, said bent end of said spindle being disposed in said base housing, said spindle further having an operating end that is opposite to said bent end and that is journalled to said spindle-journalling portion by extending into said through-hole, said adjusting unit further including an operating lever that is disposed outwardly of said base housing and that is connected securely to said operating end of said spindle and that is formed with a retaining protrusion, said operating lever being operable to co-rotate with said spindle between the first position, in which said second portion of said griddle member is disposed at a level substantially the same as that of said first portion of said griddle member, and the second position, in which said second portion of said griddle member is disposed at a level higher than that of said first portion of said griddle member, said operating level together with said spindle and said linkage plate being movable axially relative to said base unit between first and second positions, said retaining protrusion engaging said first groove when said operating level together with said spindle is disposed at said first position and said first axial position, said retaining protrusion engaging said second groove when said operating lever together with said spindle is disposed at said second position and said first axial position, said retaining protrusion being disengaged from said first groove when said operating lever together with said spindle is disposed at said first position and said second axial position, said retaining protrusion being disengaged from said second groove when said operating lever together with said spindle is disposed at said second position and said second axial position.

6. The cooking device of claim 5, wherein said adjusting unit further includes an urging member sleeved on and abutting against said spindle for urging said spindle together with said operating lever and said linkage plate toward said limiting plate.

7. The cooking device of claim 6, wherein said base unit further has at least a pair of guiding members that are spaced apart from each other by a gap, said spindle having a middle portion that extends between said bent end and said operating end and that extends through said gap so as to be guided by said guiding members when moving axially.

8. The cooking device of claim 2, wherein said griddle member is rotatable relative to said base unit about a first axis, said spindle being rotatable relative to said base unit about a second axis that is parallel to said first axis, said linkage plate being pivoted to said spindle about a third axis and being pivoted to said bracket about a fourth axis, said third and fourth axes being parallel to said first and second axes.

* * * * *